(12) United States Patent
Wilusz

(10) Patent No.: US 7,052,231 B2
(45) Date of Patent: May 30, 2006

(54) METHODS AND APPARATUS FOR INJECTING FLUIDS IN GAS TURBINE ENGINES

(75) Inventor: Christopher James Wilusz, Peabody, MA (US)

(73) Assignee: General Electric Company, Schenectady, NY (US)

( * ) Notice: Subject to any disclaimer, the term of this patent is extended or adjusted under 35 U.S.C. 154(b) by 153 days.

(21) Appl. No.: 10/424,440

(22) Filed: Apr. 28, 2003

(65) Prior Publication Data

US 2004/0213664 A1  Oct. 28, 2004

(51) Int. Cl.
*F01D 5/14* (2006.01)

(52) U.S. Cl. .................. 415/115; 415/116; 415/175; 416/96 R

(58) Field of Classification Search ................ 415/115, 415/116, 117, 175, 176, 180; 416/96 R, 416/97 R; 29/889.5, 889.722, 889.721, 889.09, 29/890.1
See application file for complete search history.

(56) References Cited

U.S. PATENT DOCUMENTS

| | | | | |
|---|---|---|---|---|
| 4,966,001 A | * | 10/1990 | Beebe | 60/737 |
| 5,001,895 A | | 3/1991 | Shekleton et al. | |
| 5,198,179 A | | 3/1993 | Bates | |
| 5,352,087 A | | 10/1994 | Antonellis | |
| 5,988,531 A | * | 11/1999 | Maden et al. | 239/406 |
| 6,224,329 B1 | * | 5/2001 | North | 415/116 |
| 6,234,746 B1 | | 5/2001 | Schroder et al. | |
| 6,435,816 B1 | * | 8/2002 | Czachor | 415/116 |

* cited by examiner

*Primary Examiner*—Hoang Nguyen
(74) *Attorney, Agent, or Firm*—William Scott Andes; Armstrong Teasdale LLP

(57) ABSTRACT

A method enables a nozzle support for a gas turbine engine to be fabricated. The method comprises forming an annular assembly including a plurality of circumferentially-spaced gas injector assemblies, wherein each gas injector assembly includes a plenum and a unitarily formed injector that extends outwardly from an outer surface of the plenum, and forming a passageway through the injector such that the passageway extends between an inlet and an outlet, and is obliquely aligned with respect to the plenum exterior surface.

14 Claims, 5 Drawing Sheets

METHODS AND APPARATUS FOR INJECTING FLUIDS IN GAS TURBINE ENGINES

BACKGROUND OF THE INVENTION

This application relates generally to gas turbine engines and, more particularly, to methods and apparatus for injecting fluids in gas turbine engines.

Known gas turbine engines include a compressor for compressing air which is mixed with a fuel and channeled to a combustor wherein the mixture is ignited within a combustion chamber for generating hot combustion gases. The hot combustion gases are channeled downstream to a turbine, which extracts energy from the combustion gases for powering the compressor, as well as producing useful work to propel an aircraft in flight or to power a load, such as an electrical generator. Accordingly, during operation, components downstream from the combustion chamber are exposed to combustion gases, and over time, continued exposure to combustion gases may increase an operating temperature of such components.

To facilitate reducing component operating temperatures, at least some known engines include cooling injection systems which discharge a cooling fluid towards the components. More specifically, at least some known cooling injection systems include a plurality of injectors coupled to an annular plenum. The annular plenum facilitates providing a substantially uniform flow to the plurality of circumferentially-spaced injectors, which then discharge the cooling flow downstream. More specifically, the cooling air is discharged from the injectors at a pre-desired injection angle to prevent from inducing turbulence in the flow downstream from the injectors. However, such cooling injection systems may be costly and time-consuming to assemble because of the plurality of welds that must be completed and because of engine space constraints.

BRIEF SUMMARY OF THE INVENTION

In one aspect, a method for fabricating a nozzle support for a gas turbine engine is provided. The method comprises forming an annular assembly including a plurality of circumferentially-spaced gas injector assemblies, wherein each gas injector assembly includes a plenum and a unitarily formed injector that extends outwardly from an outer surface of the plenum, and forming a passageway through the injector such that the passageway extends between an inlet and an outlet, and is obliquely aligned with respect to the plenum exterior surface.

In another aspect, a nozzle support for a gas turbine engine is provided. The nozzle support is annular and includes at least one gas injector assembly including a plenum and an integrally-formed injector. The plenum includes an exterior surface and an interior surface. The plenum interior surface defines a cavity within the plenum. The injector includes an inlet, an outlet, and a passageway extending therebetween and through the injector. The injector is oriented at an injection angle that is oblique with respect to the plenum exterior surface.

In a further aspect, a gas turbine engine includes an annular nozzle support including a plurality of circumferentially-spaced gas injector assemblies. Each of the gas injector assemblies includes a plenum and an injector formed unitarily with the plenum. The plenum includes an exterior surface and an interior surface. The plenum interior surface defines a cavity within the plenum. The injector includes an inlet, an outlet, and a passageway extending therebetween. The injector extends from the plenum exterior surface at an injection angle that is oblique measured with respect to the plenum exterior surface.

DETAILED DESCRIPTION OF THE INVENTION

Figure 1:
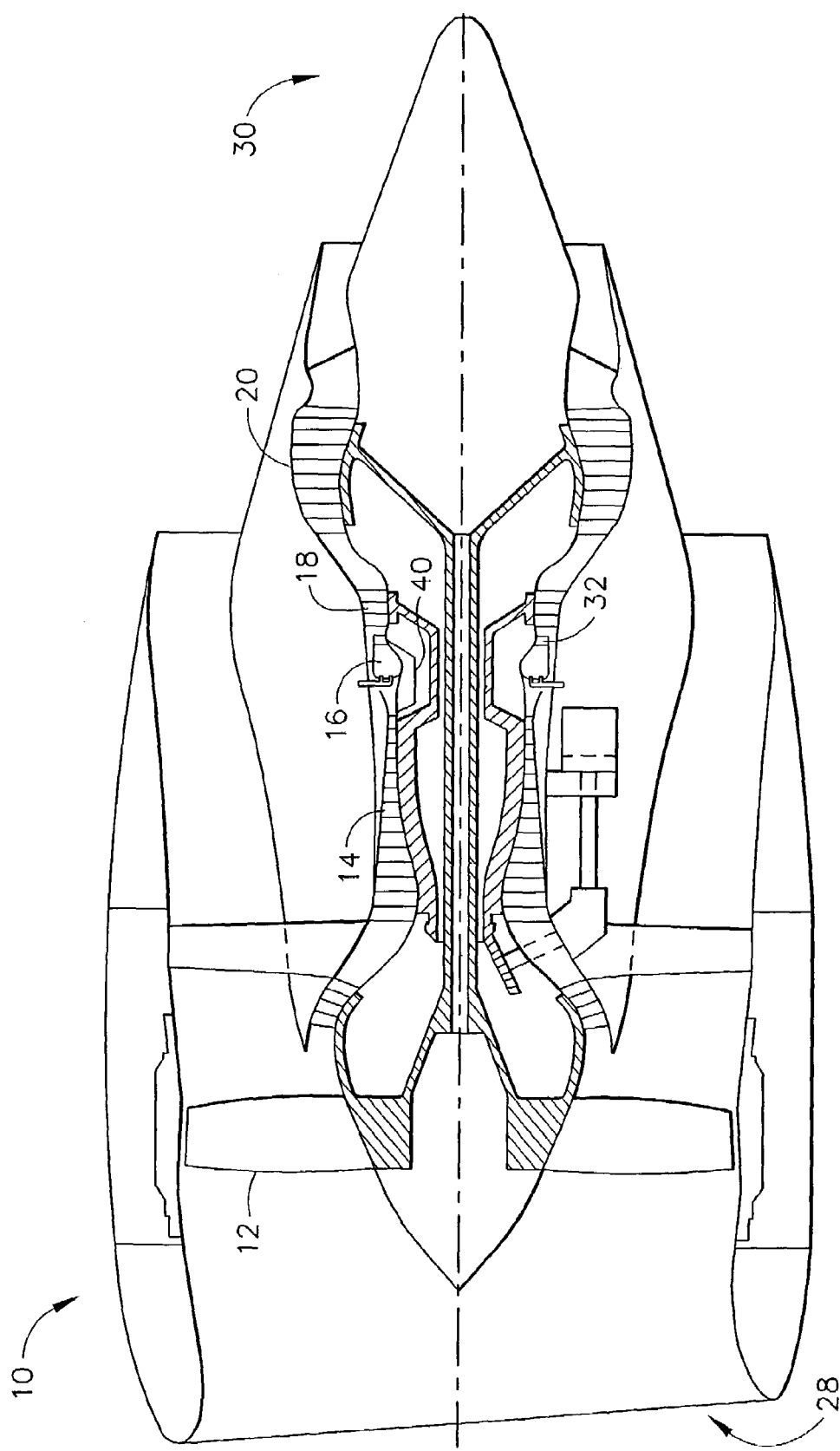
FIG. 1 is schematic illustration of a gas turbine engine.

FIG. 1 is a schematic illustration of a gas turbine engine 10 including, in serial flow arrangement, a fan assembly 12, a high-pressure compressor 14, and a combustor 16. Engine 10 also includes a high-pressure turbine 18 and a low-pressure turbine 20. Engine 10 has an intake side 28 and an exhaust side 30. In one embodiment, engine 10 is a CF-34 engine commercially available from General Electric Aircraft Engines, Cincinnati, Ohio.

In operation, air flows through fan assembly 12 and compressed air is supplied to high-pressure compressor 14. The highly compressed air is delivered to combustor 16. Airflow from combustor 16 is directed through a turbine nozzle assembly 32 to drive turbines 18 and 20, and turbine 20 drives fan assembly 12. Turbine 18 drives high-pressure compressor 14.

Figure 2:
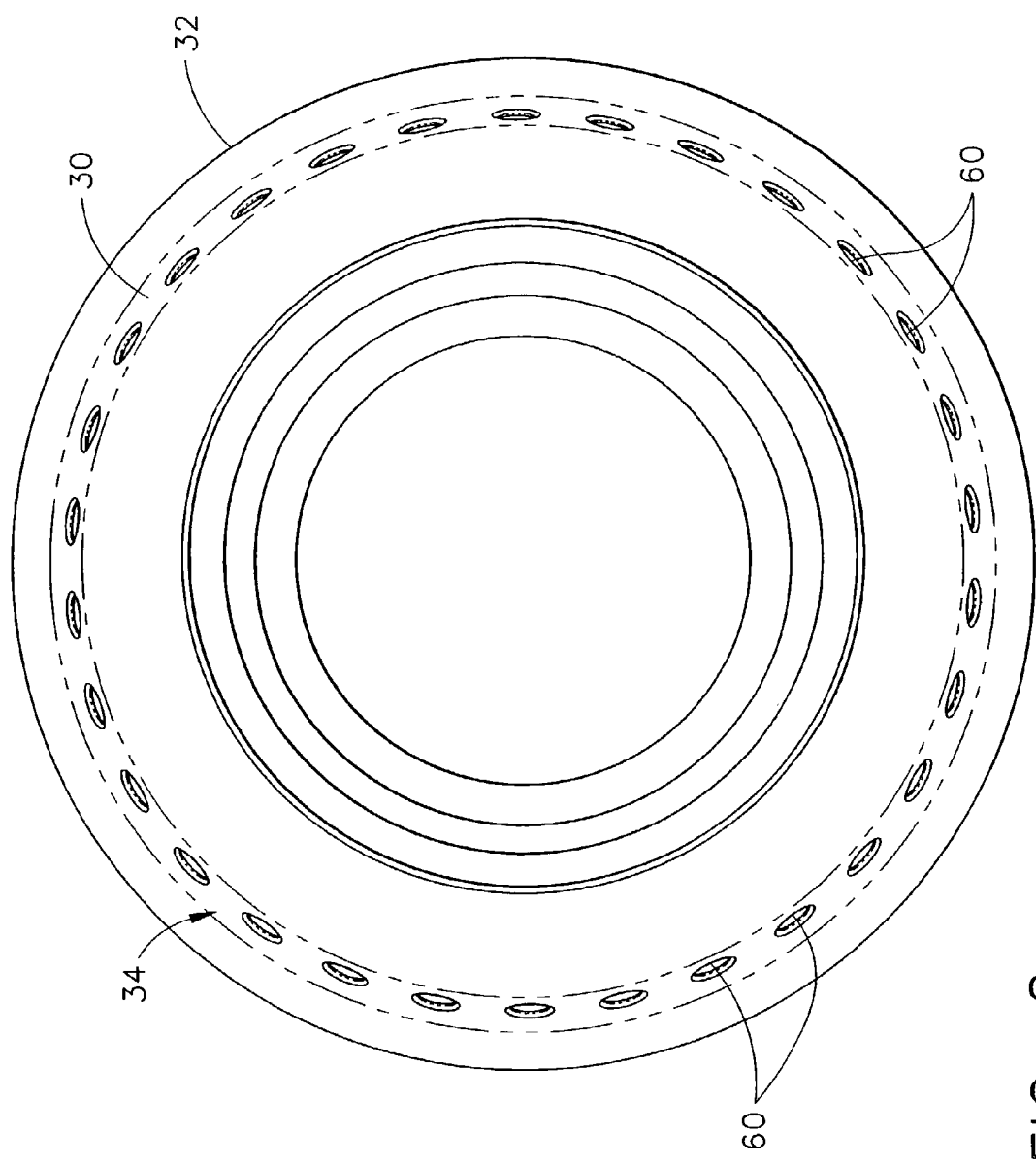
FIG. 2 is a plan view of an upstream side of a nozzle support including a gas injector system that may be used with the gas turbine engine shown in FIG. 1.
Figure 3:
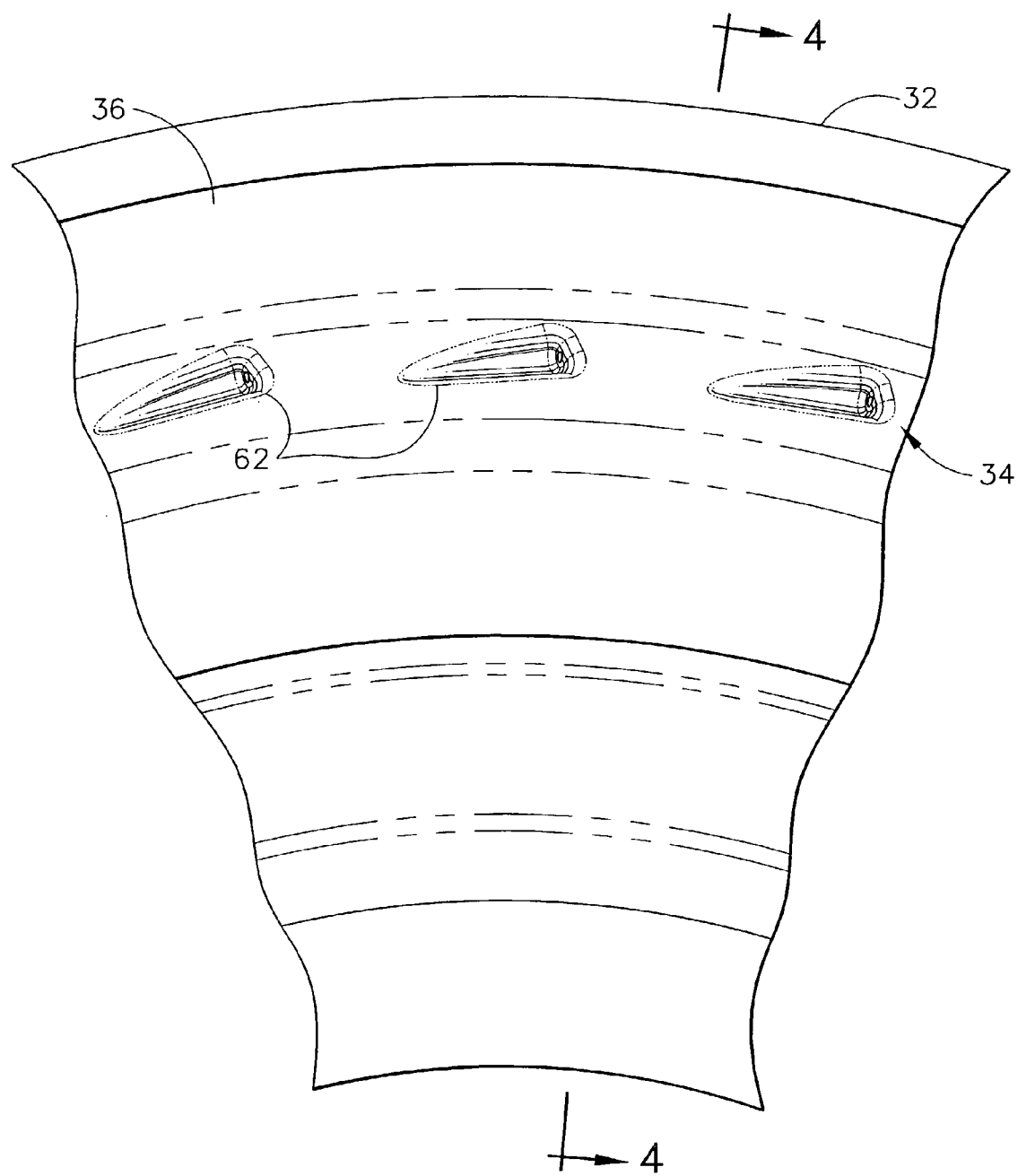
FIG. 3 is a partial plan view of the downstream side of the nozzle support shown in FIG. 2.
Figure 4:
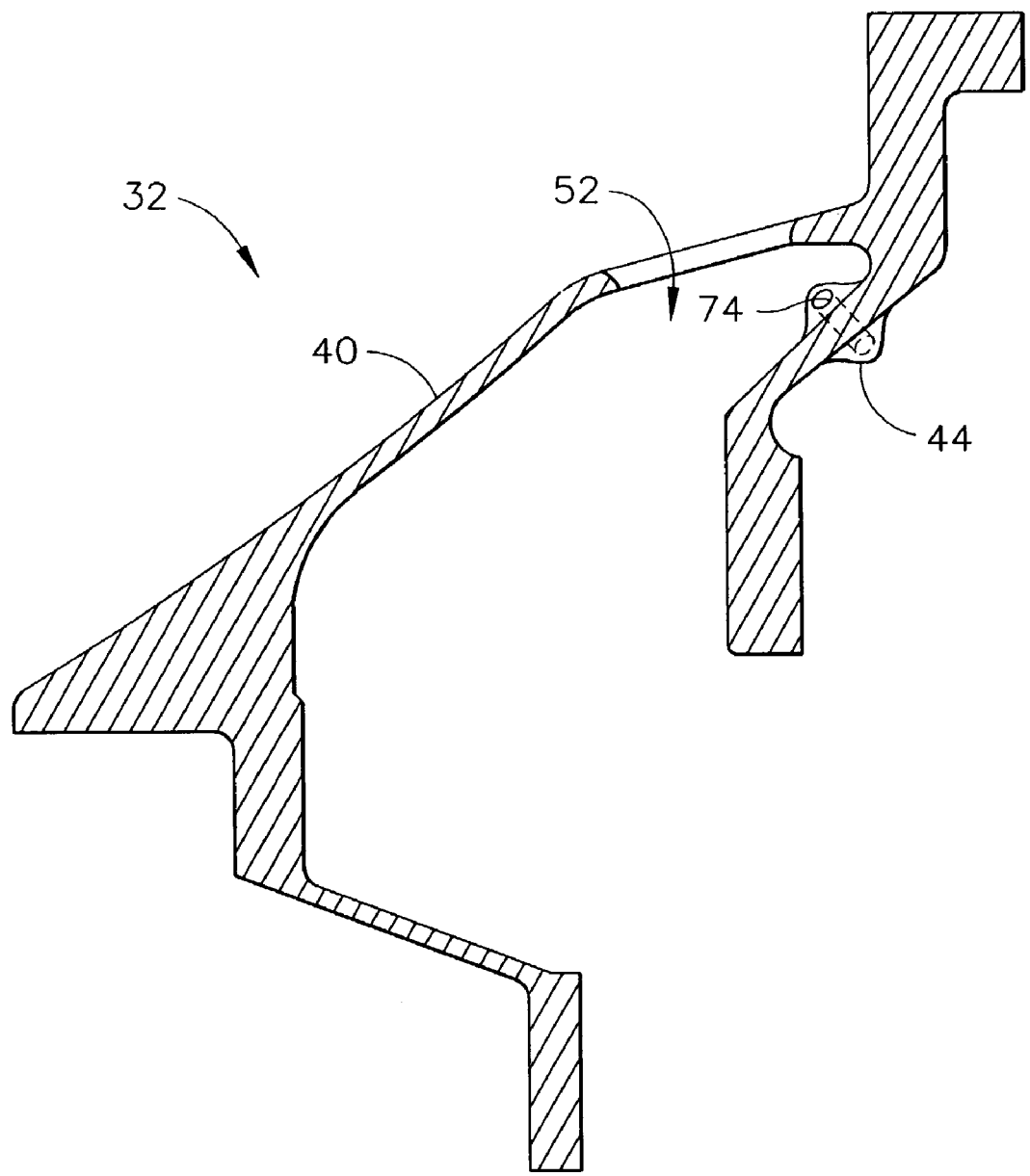
FIG. 4 is a cross-sectional view of the nozzle support shown in FIG. 2 taken along line 4—4 (shown in FIG. 2)
Figure 5:
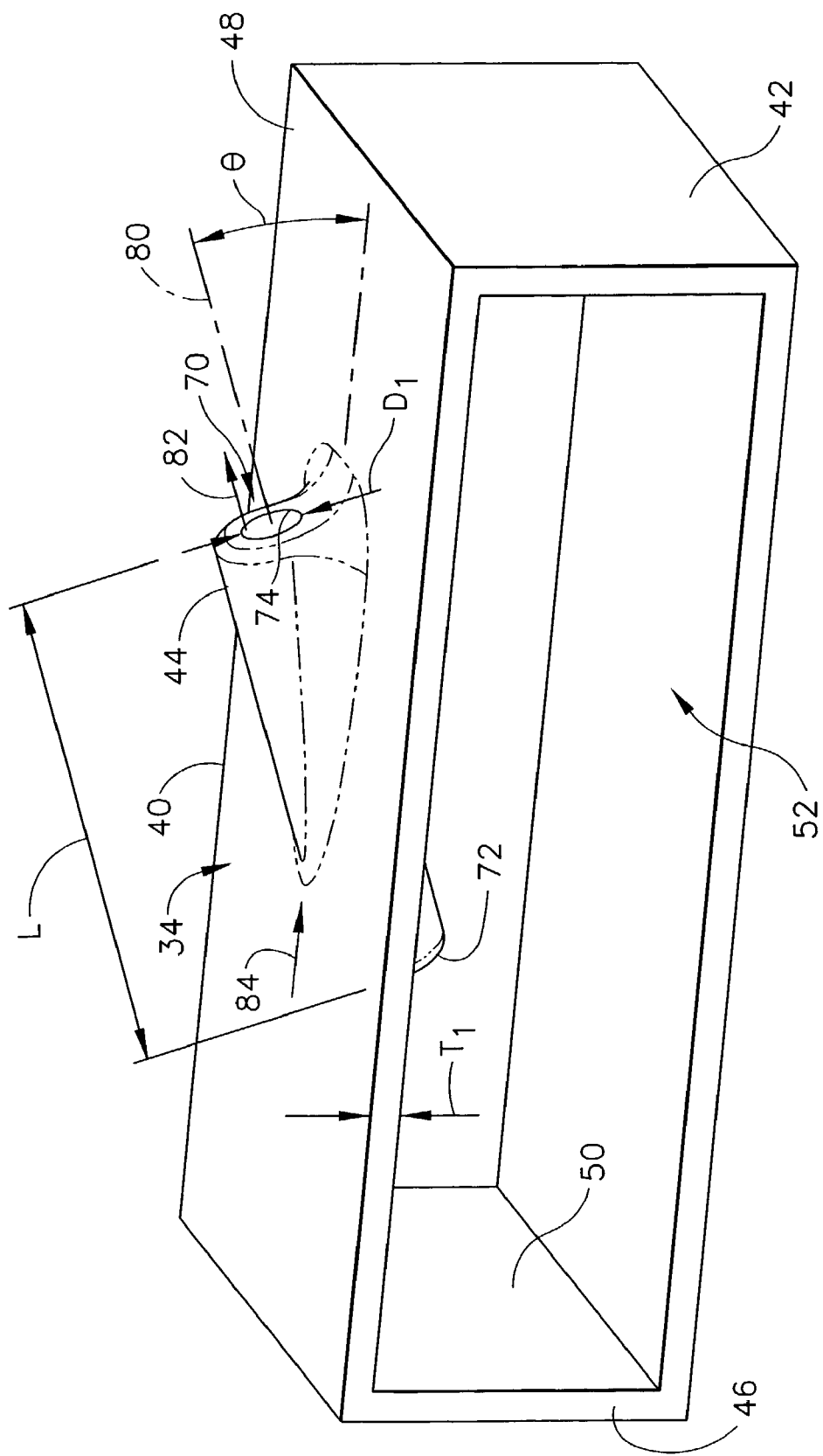
FIG. 5 is a perspective schematic view of a portion of the gas injector system shown in FIG. 2.

FIG. 2 is a plan view of upstream side 30 of a nozzle support 32 including a gas injector system 34 that may be used with gas turbine engine (shown in FIG. 1). FIG. 3 is a partial plan view of a downstream side 36 of nozzle support 32. FIG. 4 is a cross-sectional view of nozzle support 32 taken along line 4—4 (shown in FIG. 2). FIG. 5 is a perspective schematic view of a portion of gas injector system 34. Nozzle support 32 is annular and is formed unitarily with gas injector system 34.

Gas injector system 34 includes a plurality of integrally-formed gas injector assemblies 40 that extend around nozzle support 32 for injecting cooling fluid downstream from support 32 at a predetermined injection angle. More specifically, injector assemblies 40 are circumferentially-spaced and each assembly 40 includes a hollow plenum 42 and a unitarily-formed injector 44. Plenum 42 is formed by a plenum wall 46 that includes an exterior surface 48 and an interior surface 50. Interior surface 50 defines a cavity 52 within plenum 42.

Plenum 42 is considered a thin-walled plenum, and plenum wall 46 has a thickness $T_1$ that is measured between plenum interior and exterior surfaces 50 and 48, respectively. In one embodiment, plenum wall thickness $T_1$ is less than approximately 0.20 inches.

Nozzle support upstream side 30 includes a plurality of circumferentially-spaced openings 60 that are in flow communication with plenum cavity 52. Specifically, openings 60 enable cooling fluid supplied from a source (not shown) to enter plenum cavity 52. In the exemplary embodiment, openings 60 are each circular. In an alternative embodiment, openings 60 are non-circular. Nozzle support downstream side 36 also includes a plurality of circumferentially-spaced discharge passages 62 that are in flow communication with cavity 52. Discharge passages 62 permit cooling fluid to be discharged from plenum cavity 52. In one exemplary embodiment, each passage 62 has a tear-drop cross-sectional profile. In another embodiment, passage 62 have a non-tear-drop shaped cross-sectional profile.

Each injector 44 is formed unitarily with plenum 42 and includes a fluid passageway 70 defined therein and extending between an inlet 72 and an outlet 74. Passageway 70 extends through plenum wall 46 such that passageway inlet 72 is positioned within plenum cavity 52. In the exemplary embodiment, injector 44 is substantially right cylindrical and passageway 70 is substantially straight therethrough. Accordingly, passageway 70 has a circular cross-sectional area, and has a diameter $D_1$ that is substantially constant between inlet 72 and outlet 74. In an alternative embodiment, passageway diameter $D_1$ is variable between inlet 72 and outlet 74. In another alternative embodiment, passageway 70 has a non-circular cross-sectional area.

Each injector 44 extends obliquely through plenum wall 52 and obliquely from plenum exterior surface 48. Accordingly, injector passageway 70 extends obliquely through plenum wall 52, and is obliquely positioned with respect to plenum exterior surface 48. More specifically, injector passageway 70 is positioned at a pre-defined injection angle θ measured between a passageway centerline axis 80 and plenum exterior surface 48. Injection angle θ is greater than about zero degrees. More specifically, in one embodiment, injection angle θ is between approximately fifty and seventy degrees. Injection angle θ, as described in more detail below, enables fluid to be discharged from plenum cavity 52 in a direction 82 that is substantially tangential to a direction 84 of ambient fluid flowing past injector 44 and substantially parallel to plenum exterior surface 48. It should be noted that because exterior surface 48 is curved, angle θ is defined at a specified location with respect to surface 48.

Injector 44 and passageway 70 have a length L measured between passageway inlet 72 and outlet 74. Passageway length L and diameter $D_1$ are variably selected to facilitate stabilizing fluid flow through passageway 70. In one embodiment, a ratio of passageway length L to passageway diameter $D_1$ is at least two to one. More specifically, passageway length L, diameter $D_1$, and injection angle θ are variably selected based on cooling fluid requirements in a specific system incorporating gas injector system 34. Passageway length L, and injection angle θ are also dependant on the manufacturing process used to create passageway 70. In one embodiment, injector length L is selected such that passageway outlet 74 is substantially flush with, or recessed radially inwardly from plenum exterior surface 48. In another embodiment, injector length L is selected such that passageway inlet 74 is substantially flush with, or recessed within plenum interior surface 50.

During operation, cooling fluid supplied to gas injector system 34 is discharged downstream by gas injector assemblies 40. Specifically, gas is discharged from plenums 42 through injectors 44. More specifically, the combination of the injector passageway diameter $D_1$, and injector passageway length L facilitate stabilizing fluid flow flowing through injector passageway 70 prior to the cooling fluid being discharged downstream. Because injectors 44 extend obliquely from each plenum 42, cooling fluid discharged from injectors 44 is introduced substantially tangentially to ambient fluid flowing past injectors 44 such that swirling is induced to the cooling fluid as it is discharged from nozzle support 32. Accordingly, gas injector system 34 facilitates providing a substantially circumferential uniform flow downstream from nozzle support 32.

During fabrication, each unitary gas injector assembly 40 is formed such that plenum 42 and injector 44 are integrally formed. More specifically, in the exemplary embodiment, each assembly 40 is cast, and then each injector passageway 70 is formed therein using a machining process. In an alternative embodiment, a different fabrication process is used to form each unitary gas injector assembly 40. In the exemplary embodiment, each passageway 70 is formed using an electro-discharge machining process. Because gas injector assembly 40 is formed as a unitary body, gas injector system 34 may be installed in engines 10 wherein space and access constraints would prohibit known multi-piece assemblies from being coupled therein.

The above-described gas injector system provides a cost-effective and highly reliable method for supplying a substantially uniform flow circumferentially downstream in a gas turbine engine. The gas injector system includes a plurality of gas injector assemblies that each include a unitarily formed plenum and injector. Accordingly, a gas injector system is provided that facilitates reducing assembly costs while improving reliability in a cost-effective and reliable manner.

Exemplary embodiments of gas injector assemblies are described above in detail. The gas injector assemblies are not limited to the specific embodiments described herein, but rather, components of each assembly may be utilized independently and separately from other components described herein. Each gas injector assembly component can also be used in combination with other gas injector assembly components.

While the invention has been described in terms of various specific embodiments, those skilled in the art will recognize that the invention can be practiced with modification within the spirit and scope of the claims.

What is claimed is:

1. A method for fabricating a nozzle support for a gas turbine engine, said method comprising:

forming an annular assembly including a plurality of circumferentially-spaced gas injector assemblies, wherein each gas injector assembly includes a plenum and an injector that is fabricated unitarily with the plenum using one of a casting process and a machining process such that said injector extends outwardly from an outer surface of the plenum; and forming a passageway through the injector such that the passageway extends between an inlet and an outlet, and is obliquely aligned with respect to the plenum exterior surface.

2. A method in accordance with claim 1 wherein forming a passageway through the injector such that the passageway extends between an inlet and an outlet further comprises orienting each passageway to induce swirling into fluid discharged from the injectors into the plenum.

3. A method in accordance with claim 1 wherein forming a passageway through the injector such that the passageway extends between an inlet and an outlet, further comprises forming the passageway such that the cross-sectional area of the passageway is variable between the passageway inlet and outlet.

4. A nozzle support for a gas turbine engine, said nozzle support is annular and comprising at least one gas injector assembly comprising a plenum and an injector that is fabricated integrally with and being formed as one-piece with said plenum through one of a machining process and a casting process, said plenum comprising an exterior surface and an interior surface, said plenum interior surface defining a cavity within said plenum, said injector comprising an inlet, an outlet, and a passageway extending therebetween, said injector oriented at an injection angle that is oblique with respect to said plenum exterior surface.

5. A nozzle support in accordance with claim 4 wherein said injector passageway is configured to induce swirling into fluid flow discharged from said injector.

6. A nozzle support in accordance with claim 4 wherein said plenum has a thickness measured between said interior surface and said exterior surface that is less than approximately 0.200 inches.

7. A nozzle support in accordance with claim 4 wherein said injector injection angle is between approximately fifty and seventy degrees measured with respect to said plenum exterior surface.

8. A nozzle support in accordance with claim 4 wherein said injector passageway is formed by an electro-discharge machining process.

9. A nozzle support in accordance with claim 4 wherein a cross-sectional diameter of said injector passageway is variable between said injector inlet and injector outlet.

10. A gas turbine engine comprising an annular nozzle support comprising a plurality of circumferentially-spaced gas injector assemblies, each said gas injector assembly comprises a plenum and an injector that is integrally fabricated with and formed as one-piece with said plenum through one of a machining process and a casting process, said plenum comprising an exterior surface and an interior surface, said plenum interior surface defines a cavity within said plenum, said injector comprising an inlet, an outlet, and a passageway extending therebetween, said injector extends from said plenum exterior surface at an injection angle that is oblique measured with respect to said plenum exterior surface.

11. A gas turbine engine in accordance with said claim 10 wherein each said gas injection assembly injector induces swirling into fluid flow discharged from said injector.

12. A gas turbine engine in accordance with claim 11 wherein each said gas injection assembly plenum has a thickness measured between said interior surface and said exterior surface, said plenum thickness is less than approximately 0.200 inches.

13. A gas turbine engine in accordance with claim 11 wherein a cross-sectional diameter of each said injector passageway is variable between said injector inlet and injector outlet.

14. A gas turbine engine in accordance with claim 11 wherein each said injector passageway is formed by an electro-discharge machining process.

* * * * *